United States Patent
Matsumoto (10) Patent No.: US 7,177,056 B2
(45) Date of Patent: Feb. 13, 2007

(54) METHOD FOR MANUFACTURING SENSOR FRAME FOR IMAGE SENSOR

(75) Inventor: Toshio Matsumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 893 days.

(21) Appl. No.: 10/159,125

(22) Filed: Jun. 3, 2002

(65) Prior Publication Data

US 2003/0117660 A1    Jun. 26, 2003

(30) Foreign Application Priority Data

Dec. 21, 2001    (JP)    ............................. 2001-389463

(51) Int. Cl.
*H04N 1/04*    (2006.01)
(52) U.S. Cl. ...................... 358/474; 358/487; 358/482; 358/484; 250/208.1
(58) Field of Classification Search ................ 358/474, 358/487, 482, 483, 484; 250/208.1
See application file for complete search history.

(56) References Cited

U.S. PATENT DOCUMENTS

| | | | | | |
|---|---|---|---|---|---|
| 4,457,017 | A | * | 6/1984 | Onogi et al. ................. | 382/295 |
| 5,489,992 | A | * | 2/1996 | Endo ........................... | 358/482 |
| 5,569,390 | A | * | 10/1996 | Endo ........................ | 250/208.1 |
| 2004/0021064 | A1 | * | 2/2004 | Baudat ........................ | 250/239 |

* cited by examiner

*Primary Examiner*—Douglas Q. Tran
*Assistant Examiner*—Negussie Worku
(74) *Attorney, Agent, or Firm*—Oblon, Spivak, McClelland, Maier & Neustadt, P.C.

(57) ABSTRACT

A sensor frame for an image sensor is manufactured in the step of forming a sensor frame for an image sensor by extrusion molding so that a frame support portion for supporting the frame is formed above a lens array holding portion, and the step of removing the thus-formed sensor frame support portion by machining while leaving parts of the support portion located at the longitudinally corresponding to the upper ends of the lens array holding portion. Accordingly, machined surfaces subjected to the machining exist outside the hollow space where the sensor ICs are located.

7 Claims, 12 Drawing Sheets

FIG. 13

METHOD FOR MANUFACTURING SENSOR FRAME FOR IMAGE SENSOR

BACKGROUND OF THE INVENTION

The present invention relates to an image sensor for use in an image input portion of a facsimile machine, a copying machine, or the like.

Figure 9:
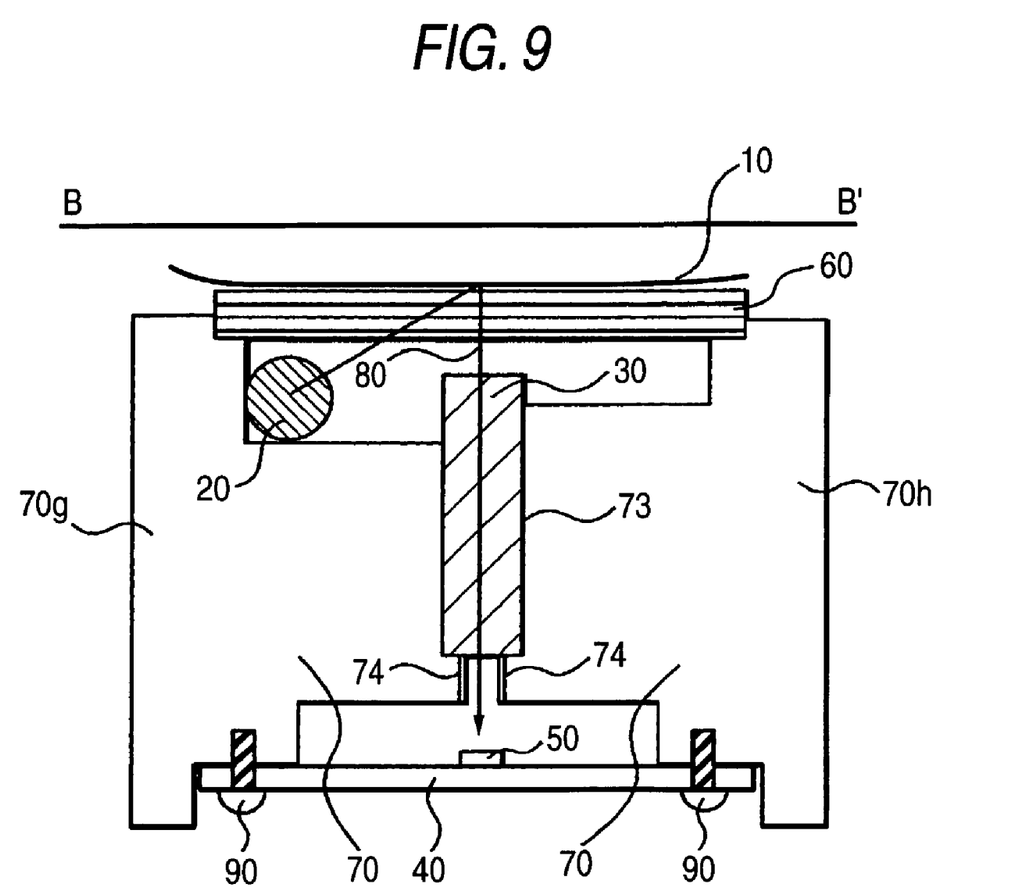
FIG. 9 is a sectional view of a related-art image sensor.
Figure 10:
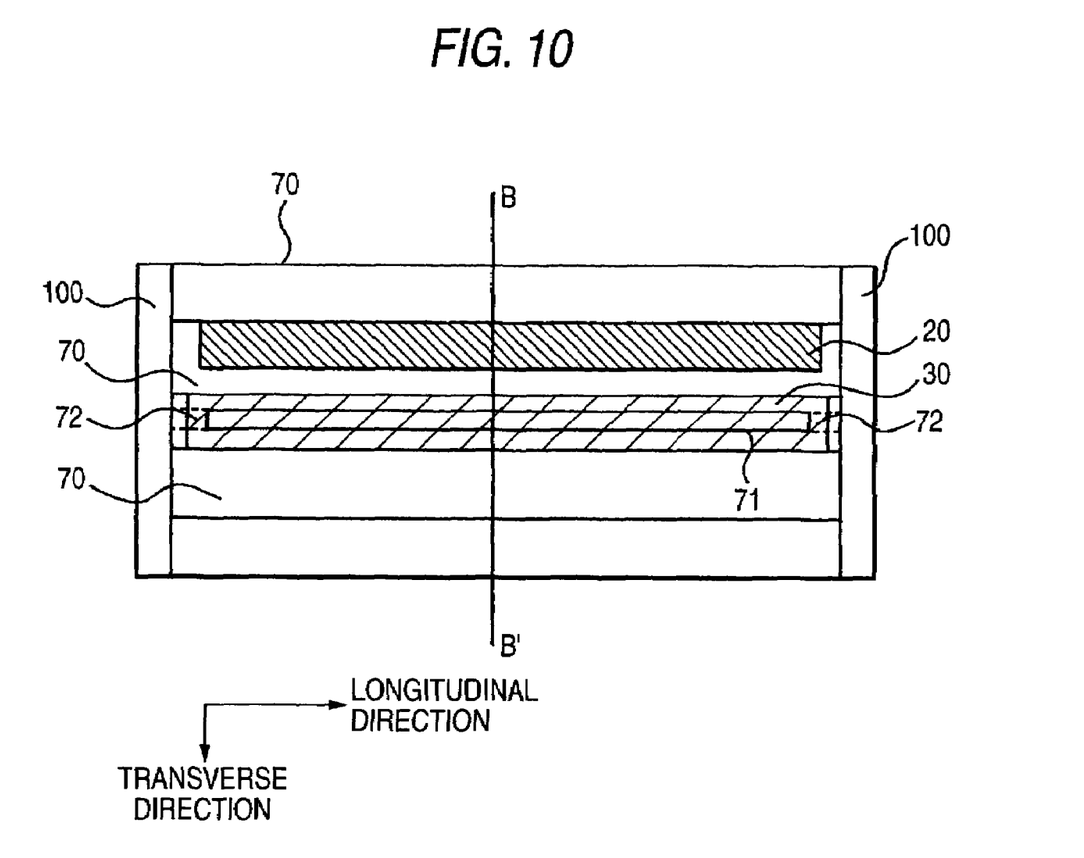
FIG. 10 is a top view of the related-art image sensor.
Figure 11:
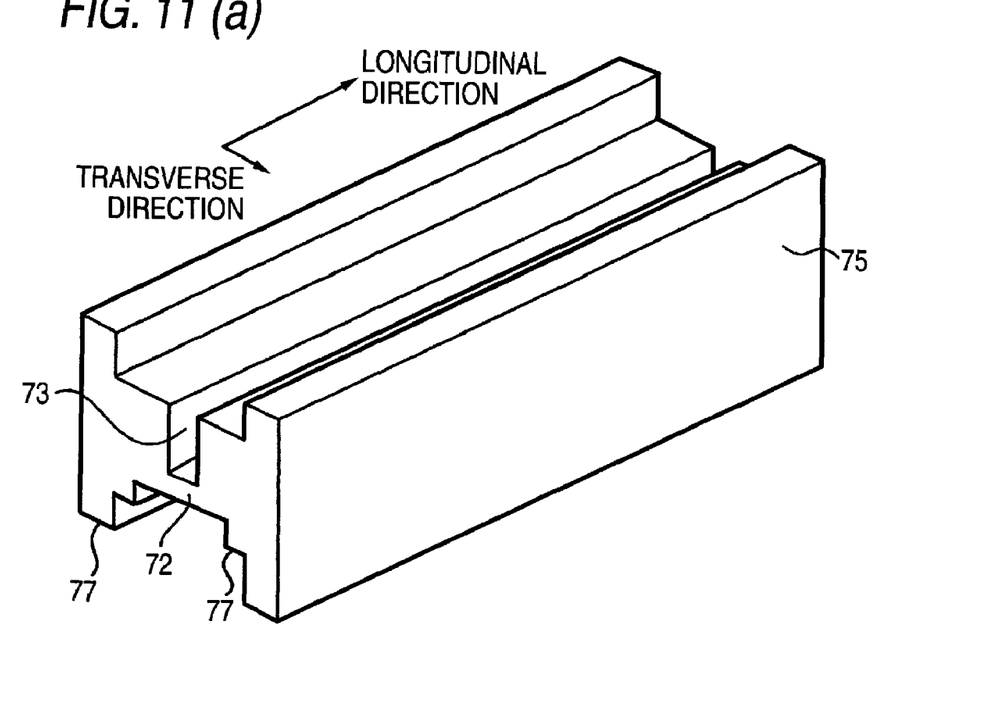
FIG. 11A is a perspective view of a sensor frame in the related-art image sensor before the sensor frame is subjected to machining.
FIG. 11B is a sectional view of the related-art sensor frame at the longitudinally central portion before the sensor frame is subjected to machining.

FIGS. 9, 10, 11A and 11B are views showing a related-art image sensor. FIG. 10 is a top view of the related-art image sensor. FIG. 9 is a sectional view taken on line B–B' in the image sensor of FIG. 10. FIG. 11A is a perspective view of a sensor frame for the image sensor after the sensor frame has been extrusion-molded of metal or resin but not yet subjected to machining. FIG. 11B is a sectional view of the sensor frame at a longitudinally central portion. In FIG. 9, the image sensor includes: a manuscript 10; a line light source 20 such as a lamp or a linear array of LED chips that can illuminate the manuscript 10 linearly; a rod lens array 30 constituted by a plurality of rod lenses (not shown) for forming a correct life-size image; a sensor substrate 40; a linear array of sensor ICs 50 formed on the sensor substrate 40; a transparent plate 60 located on a manuscript running plane; and a sensor frame 70 formed by extrusion-molding of metal or resin. The sensor frame 70 is constituted by frames 70a and 70b located on opposite sides of the rod lens array 30. In the sensor frame 70, there is further provided: a light passageway 71 which is disposed under the rod lens array 30 and through which light reflected by the manuscript passes before the reflected light enters the sensor ICs 50; a support portion 72 for supporting the frames 70a and 70b with each other; a lens array holding portion 73 for holding the rod lens array 30; machined surfaces 74 cut by machining with a result that foreign matter such as burrs and flash is produced on the machined surfaces; and sensor substrate mount portions 77 for mounting the sensor substrate 40. The image sensor further includes: a light course 80 through which light emitted from the line light source 20 is formed into an image on the sensor ICs 50; and fixing members 90 such as screws for fixing the sensor substrate 40 onto the sensor frame 70.

In FIG. 10, there are further provided plates 100 attached to the opposite ends of the sensor frame 70 so as to close a space where the light source 20 is disposed and another space where the sensor ICs 50 are located. The longitudinal direction and the transverse direction are defined by the arrows illustrated in the drawings. In addition, in FIGS. 11A and 11B, a material 75 is an extruded material of the sensor frame manufactured by extrusion but not yet subjected to machining.

Next, description will be made on the operation. The light from the line light source 20 is transmitted through the glass plate 60 and illuminates the manuscript 10 uniformly. The illumination light is reflected, as shown in the light course 80, by the manuscript 10 in accordance with gray scale information of an image formed on the basis of the manuscript 10. Thus, the reflected light passing through the rod lenses of the rod lens array 30 and through the light passageway 71 is formed into an image on light-receiving portions of the sensor ICs 50. The sensor ICs 50 accumulate charges in accordance with the intensity of the reflected light, and output the charges through the sensor substrate 40.

FIGS. 11A and 11B are a perspective view and a sectional view of the sensor frame before machining. As illustrated in FIGS. 11A and 11B, the light formed into an image by the rod lens array 30 cannot be transmitted if the sensor frame before machining is left as it is. It is therefore necessary to form the light passageway 71 by cutting out the support portion 72 by machining while leaving the opposite ends of the support portion 72 as shown by the arrow C in FIG. 11B.

At that time, when the light passageway 71 is provided by machining, foreign matter such as burrs and flash is produced on the machined surfaces 74. A work for removing the burrs and flash from the machined surfaces 74 is therefore carried out. However, since the light passageway 71 is narrow, and the machined surfaces 74 are formed to be opened not to face the upper or lower surface of the sensor frame 70 but to face side surfaces thereof, it is impossible to remove the burrs and flash from the machined surfaces 74 perfectly. Thus, the image sensor is assembled with the sensor frame 70 while the foreign matter such as burrs and flash remains on the machined surfaces 74. However, the foreign matter such as burrs and flash may fall down from the lower portion of the light passageway 71 due to vibration or impact in transit after the shipment of the image sensor. Such foreign matter may remain in the space for the sensor ICs 50 and cover the light-receiving portions wholly or partially due to subsequent vibration or impact. Thus, there has been a problem that the gray scale information of an image formed on the basis of the manuscript 10 cannot be transmitted to the sensor ICs 50 correctly.

Figure 12:
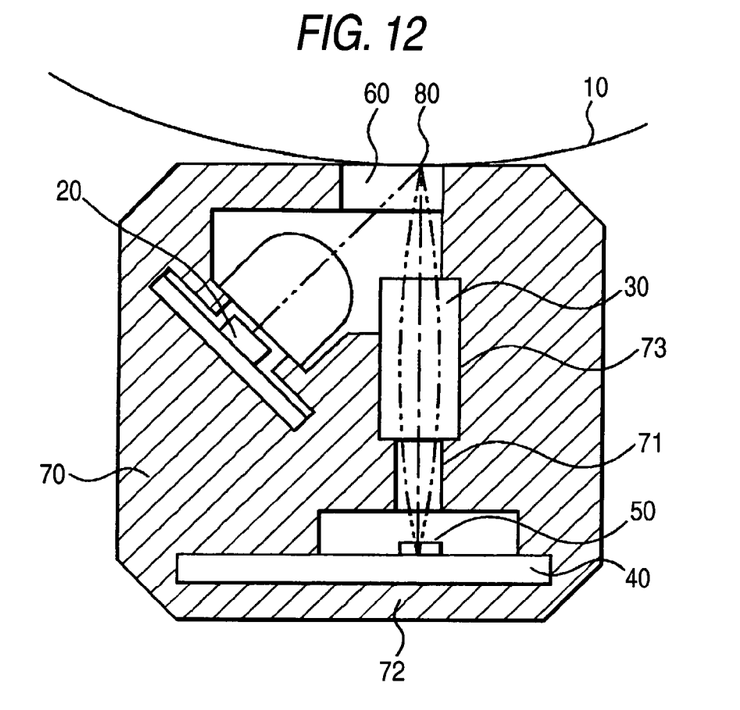
FIG. 12 is a sectional view of a related-art image sensor.
Figure 13:
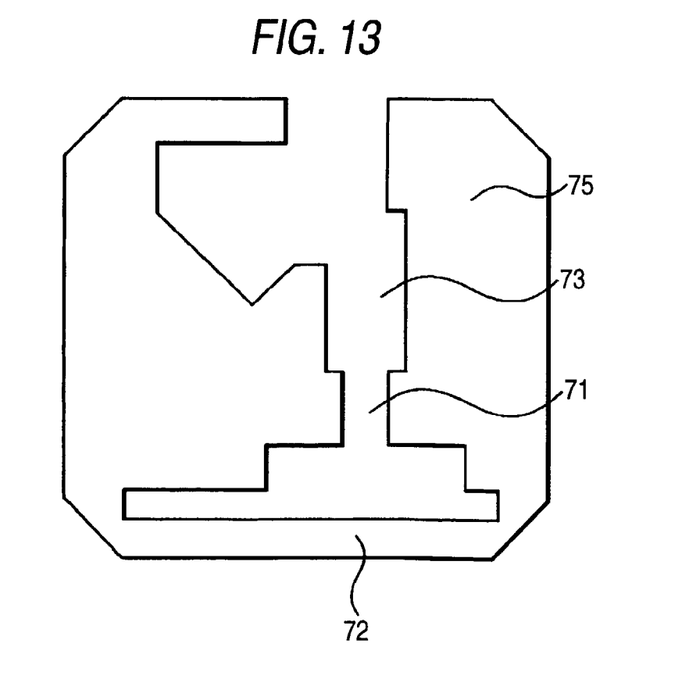
FIG. 13 is a sectional view of a sensor frame for the related-art image sensor.

The Unexamined Japanese Patent Application Publication No. Hei7-162587 discloses an example in which the light passageway 71 is not provided by machining. FIGS. 12 and 13 show a related-art image sensor disclosed in the Unexamined Japanese Patent Application Publication No. Hei7-162587. FIG. 12 is a sectional view, and FIG. 13 is a view showing a section of an extruded material of a frame for the image sensor. A manuscript 10, a line light source 20, a rod lens array 30, a sensor substrate 40, sensor ICs 50, a transparent plate 60, a sensor frame 70, a light passageway 71, a support portion 72 and a light course 80 have the same configurations and the same operations as those shown in FIG. 9, respectively.

In this case, the transparent plate 60 and the sensor frame 70 are formed integrally with each other by extrusion molding of transparent plastic and colored metal or resin. Therefore, the light passageway 71 is provided over the whole length of the sensor frame 70 in advance, so that it is not necessary to provide the light passageway 71 by machining. In addition, the support portion 72 for supporting frames 70a and 70b with each other is located on the lower side of the sensor substrate 40. Thus, when the sensor substrate 40 is mounted on the support portion 72, the sensor substrate 40 is inserted into the sensor frame 70 from an end portion.

However, according to this method, the sensor substrate 40 is inserted into the sensor frame 70 and then assembled with the latter. The sensor substrate 40 and the sensor frame 70 may be rubbed against each other. Either the sensor substrate 40 or the sensor frame 70 may be shaved by this rubbing. The light-receiving portions of the sensor ICs 50 are wholly or partially covered likewise with such shaved material as foreign matter. Thus, there has been a problem that the gray scale information of an image formed on the basis of the manuscript 10 cannot be transmitted to the sensor ICs 50 correctly.

SUMMARY OF THE INVENTION

The invention is achieved to solve the foregoing problems. An object of the invention is to provide an image sensor which has light-receiving portions of sensor ICs not covered with foreign matter so that gray scale information of an image formed on the basis of a manuscript can be transmitted to the sensor ICs correctly.

According to the invention, there is provided a method for manufacturing a sensor frame for an image sensor, having the steps of: integrally forming the sensor frame by extrusion molding of metal or resin, the sensor frame including a sensor substrate mount portion, a light passageway, a lens array holding portion, and a frame support portion, the sensor substrate mount portion being opened for mounting a sensor substrate thereon, the light passageway being provided to communicate with the sensor substrate mount portion so that light reflected by a manuscript is transmitted to the sensor substrate through a rod lens array, the lens array holding portion being provided to communicate with the passageway for holding the rod lens array, the frame support portion being provided to support transversely the upper ends of the lens array holding portion; and removing the frame support portion by machining while leaving parts of the frame support portion located at longitudinally corresponding to the upper ends of the lens array holding portion.

Further, there is provided another method for manufacturing a sensor frame for an image sensor, having the steps of: integrally forming the sensor frame by extrusion molding of metal or resin, the sensor frame including a sensor substrate mount portion, a frame support portion, a light passageway, and a lens array holding portion, the sensor substrate mount portion being provided for mounting a sensor substrate thereon, the frame support portion being provided under the sensor substrate mount portion so that a hollow portion is formed between the frame support portion and the sensor substrate mount portion, the light passageway being provided to communicate with the sensor substrate mount portion so that light reflected by a manuscript is transmitted to the sensor substrate through a rod lens array, the lens array holding portion being provided to communicate with the passageway for holding the rod lens array; and removing the frame support portion by machining while leaving parts of the frame support portion located at longitudinally corresponding to the lower ends of the sensor substrate mount portion.

In addition, there is provided a further method for manufacturing a sensor frame for an image sensor, having the steps of: integrally forming the sensor frame by extrusion molding of either metal or resin, the sensor frame including a sensor substrate mount portion, a light passageway, a lens array holding portion, and a frame support portion, the sensor substrate mount portion being opened for mounting a sensor substrate thereon, the light passageway being provided to communicate with the sensor substrate mount portion so that light reflected by a manuscript is transmitted to the sensor substrate through a rod lens array, the lens array holding portion being provided to communicate with the light passageway for holding the rod lens array, the frame support portion being provided in a position facing the manuscript; and removing the frame support portion by machining while leaving parts of the frame support portion located at longitudinally corresponding to the upper ends of the sensor frame.

DETAILED DESCRIPTION OF THE PREFERRED EMBODIMENTS (Embodiment 1)

In Embodiment 1 of the invention, description will be made on an image sensor. That is, in the image sensor, a sensor frame extrusion-molded of aluminum has a lens array holding portion and a support portion provided above the lens array holding portion. The support portion is removed by machining while parts of the support portion located at the peripherals of the opposite ends of the sensor frame are left. Thus, reflected light by a manuscript is allowed to enter sensor ICs through the part removed by machining. Accordingly, there is no fear that foreign matter such as burrs and flash produced on the machined surfaces adheres to the sensor ICs located under the lens array holding portion.

Figure 1:
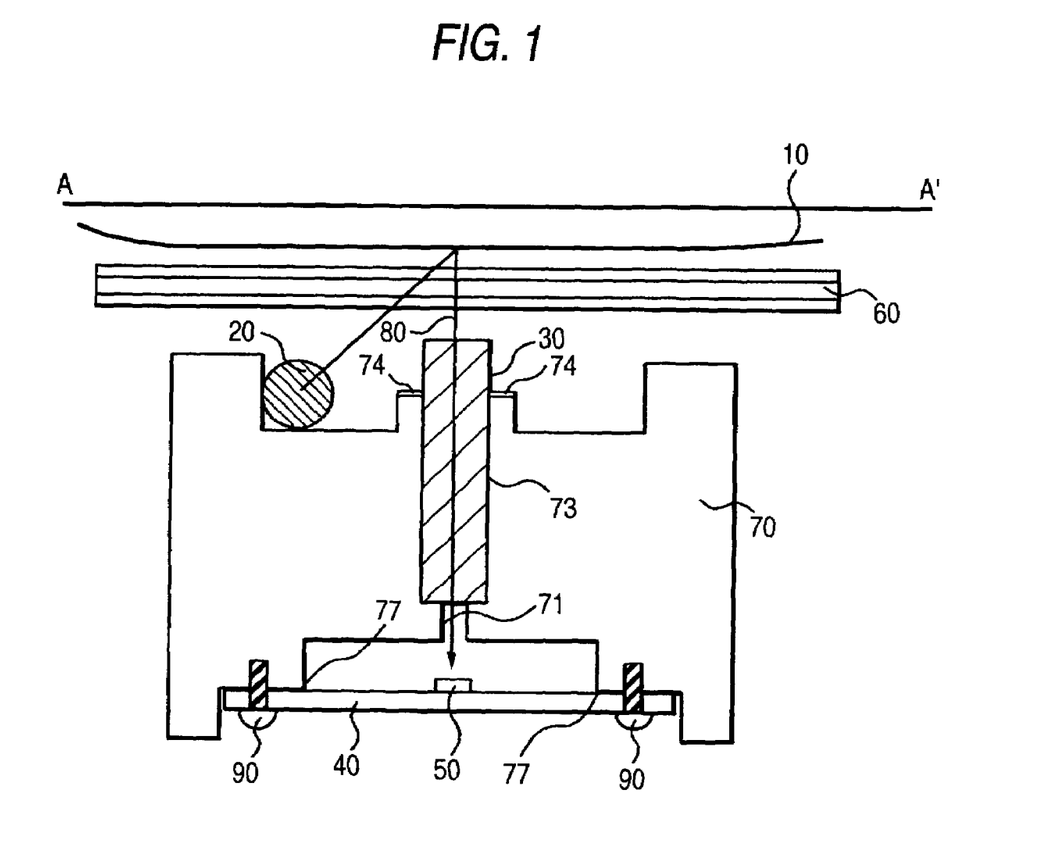
FIG. 1 is a sectional view of an image sensor according to Embodiment 1 of the invention.
Figure 2:
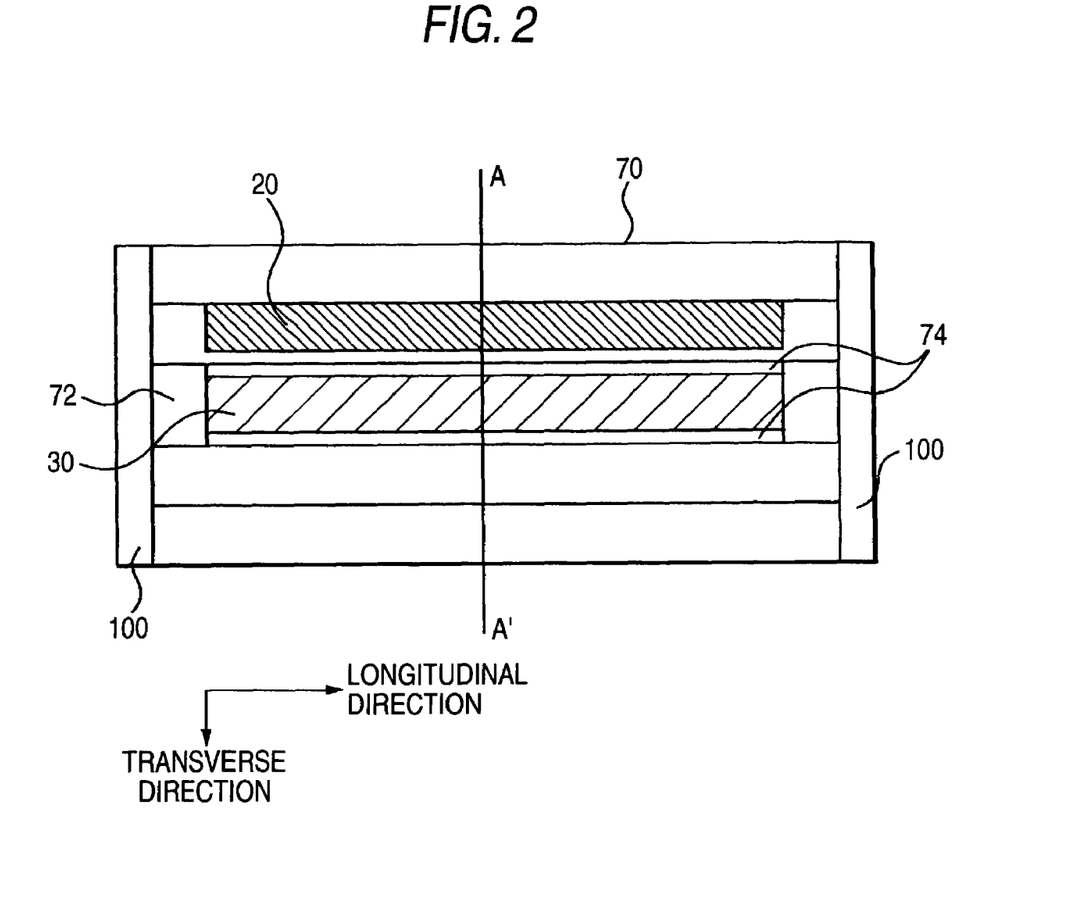
FIG. 2 is a top view of the image sensor according to Embodiment 1 of the invention.

FIG. 1 is a sectional view of an image sensor according to Embodiment 1 of the invention, and FIG. 2 is a top view of a sensor frame for the image sensor. The longitudinal direction and the transverse direction are defined by the arrows in FIG. 2. In FIG. 1, the image sensor includes: a manuscript 10; a line light source 20 such as a lamp or a linear array of LED chips that can illuminate the manuscript 10 linearly; a rod lens array 30 constituted by a plurality of rod lenses (not shown) for forming a correct life-size image; a sensor substrate 40; a linear array of sensor ICs 50 formed on the sensor substrate 40; a transparent plate 60 located on a manuscript running plane; and a sensor frame 70 formed by extrusion-molding of aluminum. The sensor frame 70 is constituted by frames 70a and 70b respectively located on opposite sides of the rod lens array 30. In the sensor frame 70, there is further provided: a light passage 71 which is located under the rod lens array 30 and from which the light reflected by the manuscript 10 passes before the reflected light enters the sensor ICs 50; a support portion 72 for supporting the frames 70a and 70b with each other; a lens array holding portion 73 for holding the rod lens array 30; machined surfaces 74 worked by machining apparatus such as a machining center or a press with a result that foreign matter such as burrs and flash is produced on the machined surfaces 74; and sensor substrate mount portions 77 provided in the lower surface of the sensor frame 70 for mounting the sensor substrate 40. The image sensor further includes: a course 80 through which light emitted from the line light source 20 is formed into an image on the sensor ICs 50; and fixing members 90 such as screws for fixing the sensor substrate 40 onto the sensor frame 70.

As shown in FIG. 2, there are further provided plates 100 attached to the opposite ends of the sensor frame 70 respectively so as to close the space in which the sensor ICs 50 are located.

Figure 3:
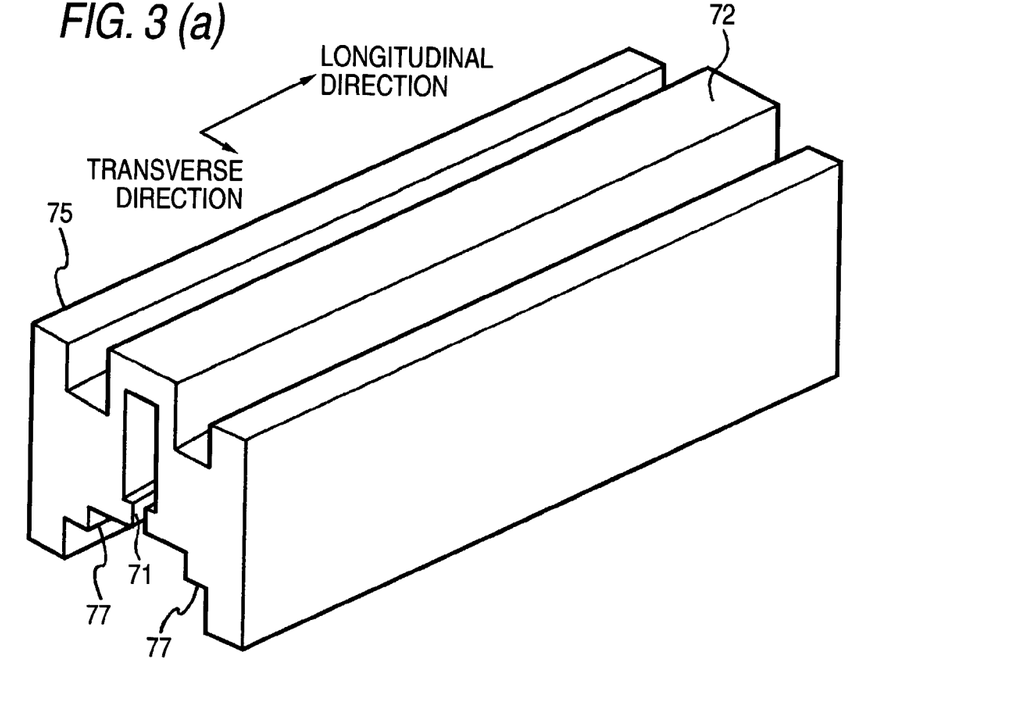
FIG. 3A is a perspective view of a sensor frame according to Embodiment 1 of the invention before the sensor frame is subjected to machining.
FIG. 3B is a sectional view of the sensor frame at the longitudinally central portion before the sensor frame is subjected to machining.

In addition, FIG. 3A is a perspective view of the sensor frame before machining. FIG. 3B is a sectional view of the sensor frame at the longitudinally central portion. A sensor frame 75 is a sensor frame before machining.

Figure 4:
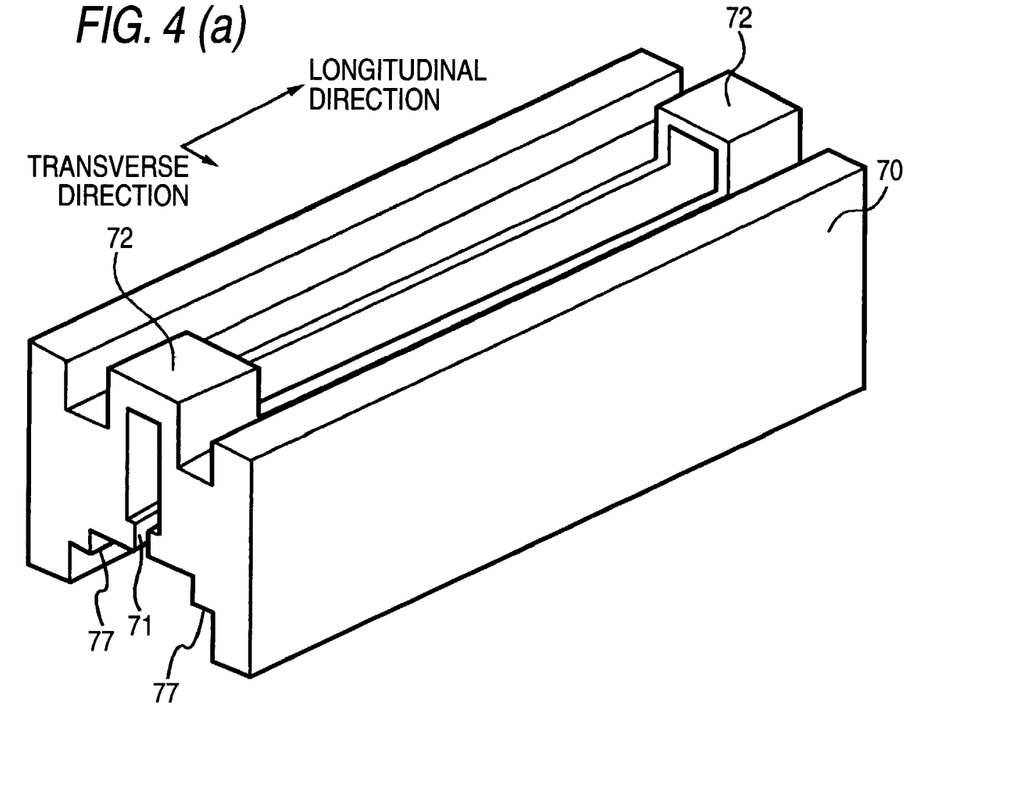
FIG. 4A is a perspective view of the sensor frame according to Embodiment 1 of the invention after the sensor frame has been subjected to machining.
FIG. 4B is a sectional view of the sensor frame at the longitudinally central portion after the sensor frame has been subjected to machining.

In addition, FIG. 4A is a perspective view of the sensor frame which has been subjected to machining. FIG. 4B is a sectional view of the sensor frame at the longitudinally central portion.

The image sensor according to Embodiment 1 is used for an image input portion of a so-called flatbed type, in which the transparent plate 60 is fixed while the sensor frame 70 moves for reading information from the manuscript 10.

Description will be made on the sensor frame for the image sensor according to Embodiment 1 of the invention. First, a sensor frame 75 as shown in FIG. 3A is formed by extrusion of a material such as metal or resin. Not to say, if the sensor frame 75 is left as it is, the support portion 72 exists over the whole length of the sensor frame 75 so that the light reflected by the manuscript cannot be transmitted through the rod lens array 30. Next, the support portion 72 is therefore removed by machining with a machining center or the like while parts of the support portion 72 located at the peripheries of the opposite ends of the sensor frame 75 are left. The sensor frame which has been subjected to such machining is a sensor frame 70 shown in FIG. 4A.

At that time, the sensor frame 70 which has been subjected to the machining has a section as shown in FIG. 4B. In such a manner, the machined surfaces 74 are located above the lens array holding portion 73. Accordingly, the work of removing foreign matter such as burrs and flash from the machined surfaces 74 can be performed easily. In addition, even if there remained some foreign matter on the machined surfaces 74, the rod lens array 30 mounted on the machined surfaces 74 could prevent the foreign matter from adhering to the sensor ICs 50 due to vibration or impact in transit after shipment.

In addition, the sensor substrate mount portions 77 of the sensor frame 70 are opened thus so that the sensor substrate 40 can be mounted on the sensor substrate mount portions 77 without insertion. Accordingly, it is possible to suppress production of foreign matter which might be produced by shaving the sensor frame 70 and the sensor substrate 40 if the sensor substrate 40 were to be inserted into the sensor frame 70.

After the sensor frame 70 is machined thus, the line light source 20, the rod lens array 30, and the sensor substrate 40 having the sensor ICs 50 mounted thereon have been mounted on the sensor frame 70 without insertion. Thus, the manuscript reading portion of the image sensor according to Embodiment 1 is completed.

Incidentally, in the reading mode described above, the transparent plate 60 is made independent of the frame 70 so that the transparent plate 60 is fixed while the sensor frame 70 is moved for reading the manuscript 10. However, in an image sensor of a so-called sheet-feed type, the configuration may be made so that the transparent plate 60 is fixed to the sensor frame 70 and the image sensor is fixed to the image input portion while the manuscript 10 is moved to be read. Also by the latter image sensor, similar effects can be obtained.

As described above, according to Embodiment 1 of the invention, the sensor frame 75 is extrusion-molded so as to have the sensor substrate mount portions 77 opened, and the support portion 72 located above the lens array holding portion 73. Then, the support portion 72 is removed by machining while parts of the support portion 72 located at the longitudinally corresponding to the upper ends of the lens array holding portion 73 are left. Thus, the machined surfaces 74 are located above the lens array holding portion 73. With such a configuration, the work of removing foreign matter from the machined surfaces 74 after the machining can be carried out easily. In addition, the rod lens array 30 is held in the lens array holding portion 73 so that the hollow space where the sensor ICs 50 are located is sealed off. Accordingly, even if the sensor frame 70 is incorporated in the image sensor in the condition that burrs and flash cannot be removed from the machined surfaces 74 perfectly, there is no fear that the light-receiving portions of the sensor ICs 50 are covered with foreign matter. Thus, the gray scale information of an image formed on the basis of the manuscript 10 can be transmitted to the sensor ICs 50 correctly.

In addition, the sensor substrate mount portions 77 are opened in configuration so that the sensor substrate 40 can be mounted on the sensor substrate mount portions 77 without insertion. Accordingly, there is no production of foreign matter which might be produced by shaving the sensor frame 70 and the sensor substrate 40 if the sensor substrate 40 were to be inserted into the sensor frame 70.

Incidentally, an example in which aluminum was used as metal was shown in Embodiment 1. However, any kind of metal, any kind of alloy or any kind of resin may be used so long as such a material is suitable for extrusion-molding and can make the support portion 72 keep sufficient strength after machining.

(Embodiment 2)

In Embodiment 1, a sensor frame is formed by extrusion molding so that a sensor frame support portion is located above a lens array holding portion. Then, this support portion is removed by machining while parts of the support portions located at the longitudinally corresponding to the upper ends of the lens array holding portion are left. On the other hand, in Embodiment 2, a sensor frame is formed by extrusion molding so that a sensor frame support portion is located under sensor substrate mount portions. Then, this support portion is removed by machining while parts of the support portion located at the longitudinally corresponding to the lower ends of the sensor substrate mount portions are left.

Figure 5:
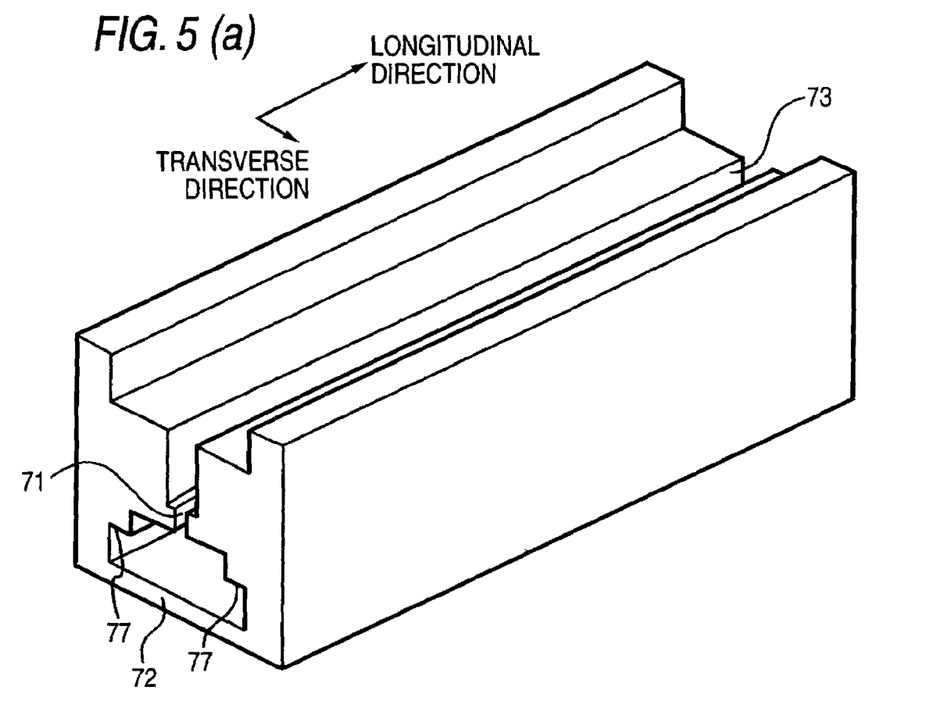
FIG. 5A is a perspective view of a sensor frame according to Embodiment 2 of the invention before the sensor frame is subjected to machining.
FIG. 5B is a sectional view of the sensor frame at the longitudinally central portion before the sensor frame is subjected to machining.
Figure 6:
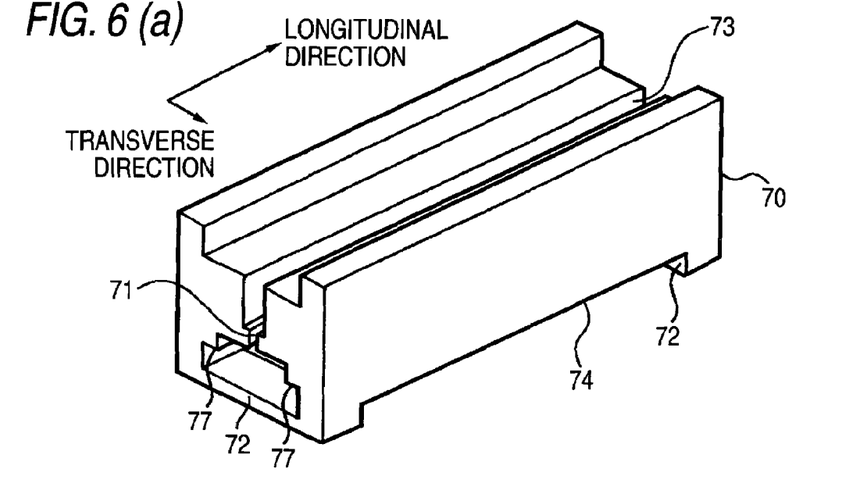
FIG. 6A is a perspective view of the sensor frame according to Embodiment 2 of the invention after the sensor frame has been subjected to machining.
FIG. 6B is a sectional view of the sensor frame at the longitudinally central portion after the sensor frame has been subjected to machining.
FIG. 6C is a sectional view of the sensor frame at the longitudinally central portion after respective parts have been mounted on the sensor frame.

Embodiment 2 will be described below. FIG. 5A is a perspective view of a sensor frame according to Embodiment 2 before the sensor frame is subjected to machining. FIG. 5B is a sectional view of the sensor frame at the longitudinally central portion. In addition, FIG. 6A is a perspective view of the sensor frame which has been subjected to machining. FIG. 6B is a sectional view of the sensor frame at the longitudinally central portion. FIG. 6C is a sectional view of the sensor frame 70 on which a line light source 20, a rod lens array 30, and a sensor substrate 40 having sensor ICs 50 mounted thereon have been mounted. In the respective drawings, constituent parts the same as those in the sensor frame according to Embodiment 1 are referenced correspondingly.

As shown in FIGS. 5A and 5B, in Embodiment 2, the sensor frame 75 is extrusion-molded of aluminum so that a support portion 72 of the frame is located under sensor substrate mount portions 77. Then, as shown in FIG. 6A, the support portion 72 provided over the whole length of the sensor frame 75 is removed by machining while parts of the support portion 72 located at the longitudinally corresponding to the lower ends of the sensor substrate mount portions 77 are left. A sensor frame 70 formed thus by this step has a section shown in FIG. 6B. For convenience in explanation, FIG. 6C shows the state where the sensor substrate 40 having the sensor ICs 50 mounted thereon has been mounted on the sensor substrate mount portions 77.

Then, as shown in FIG. 6C, the sensor substrate 40 and the rod lens array 30 are mounted on the sensor frame 70 respectively, and further plates 100 (not shown) are mounted on the sensor frame 70 in a direction vertical to the plane of FIG. 6C. Thus, the space where the sensor ICs 50 are located is sealed off. Accordingly, there is no fear that foreign matter such as burrs and flash produced on the machined surfaces 74 enters the space where the sensor ICs 50 are located.

In addition, the machined surfaces 74 are exposed at the lower portion of the sensor frame 70. Thus, the work of removing foreign matter from the machined surfaces 74 after machining can be performed easily.

In addition, since the sensor substrate mount portions 77 are opened in configuration, it is not necessary to mount the sensor substrate 40 on the sensor frame 70 by insertion.

As described above, according to Embodiment 2, the sensor frame 70 is extrusion-molded so that the support portion 72 is located under the sensor substrate mount portions 77. Then, the support portion 72 is removed by machining while parts of the support portion 72 located at the longitudinally corresponding to the lower ends of the sensor substrate mount portions 77 are left. Thus, the machined surfaces 74 are located on the opposite side to the sensor ICs 50 through the intermediation of the sensor substrate 40 when the sensor substrate 40 is mounted on the sensor substrate mount portions 77. Thus, the work of removing foreign matter from the machined surfaces 74 can be performed easily. In addition, even if foreign matter is left on the machined surfaces 74, there is no fear that the foreign matter adheres to the sensor ICs 50 due to vibration or impact in transit after shipment.

In addition, since the sensor substrate mount portions 77 are opened in configuration, the sensor substrate 40 can be mounted on the sensor substrate mount 77 without insertion. Accordingly, there is no production of foreign matter which might be produced by shaving the sensor frame 70 and the sensor substrate 40 if the sensor substrate 40 were to be inserted into the sensor frame 70.

Incidentally, in the reading mode described above, the transparent plate 60 is made independent of the frame 70, so that the transparent plate 60 is fixed while the sensor frame 70 is moved for reading the manuscript 10. However, in an image sensor of a so-called sheet-feed type, the configuration may be made so that the transparent plate 60 is fixed to the sensor frame 70 and the image sensor is fixed to the image input portion while the manuscript 10 is moved to be read. Also by the latter image sensor, similar effects can be obtained.

Incidentally, an example in which aluminum was used as metal was shown in Embodiment 2. However, any kind of metal, any kind of alloy or any kind of resin may be used so long as such a material is suitable for extrusion-molding and can make the support portion 72 keep sufficient strength after machining.

(Embodiment 3)

In Embodiment 2, a sensor frame is formed by extrusion molding so that a sensor frame support portion is located under sensor substrate mount portions. Then, this support portion is removed by machining while parts of the support portion located at the longitudinally corresponding to the lower ends of the sensor substrate mount portions are left. On the other hand, in this Embodiment 3, a sensor frame is formed by extrusion molding so that a sensor frame support portion is located in the upper portion of the sensor frame. Then, this support portion is removed by machining while parts of the support portion located at the longitudinally corresponding to the upper ends of the sensor frame are left.

Figure 7:
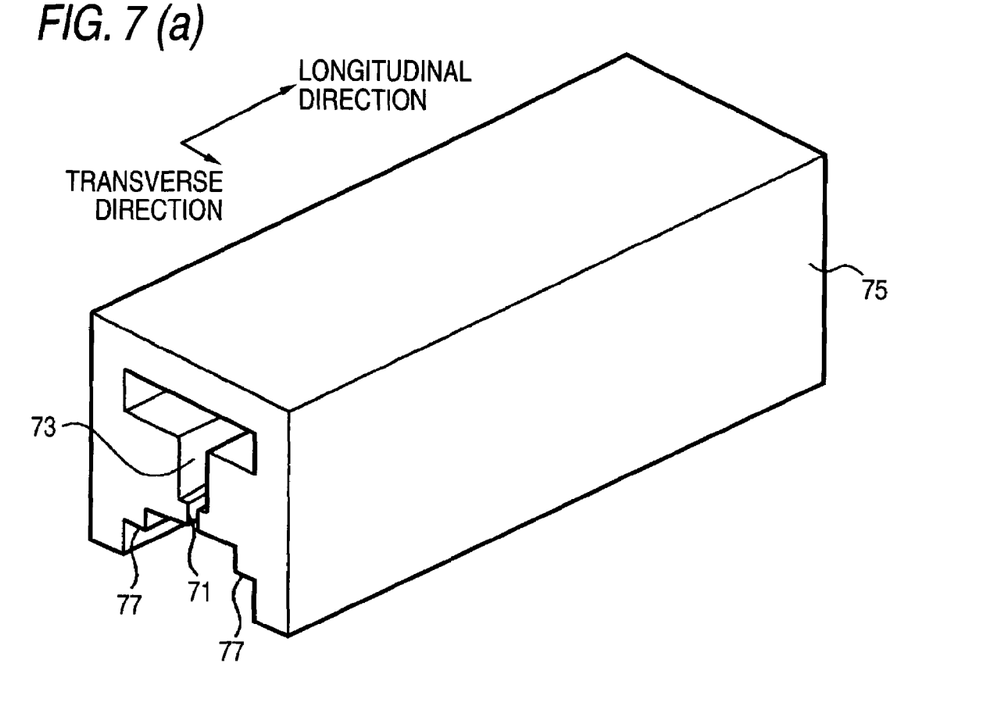
FIG. 7A is a perspective view of a sensor frame according to Embodiment 3 of the invention before the sensor frame is subjected to machining.
FIG. 7B is a sectional view at the longitudinally central portion of the sensor frame before the sensor frame is subjected to machining.
Figure 8:
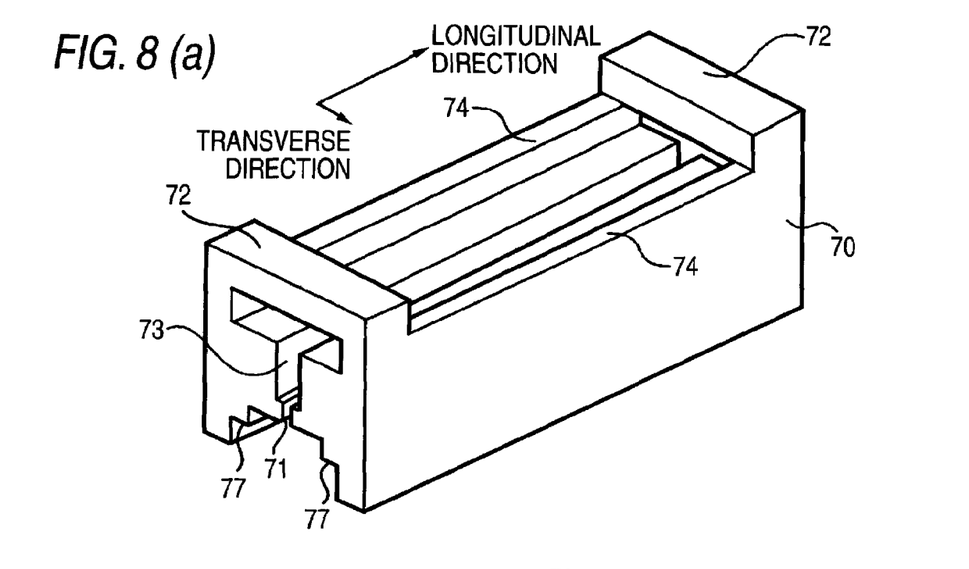
FIG. 8A is a perspective view of the sensor frame according to Embodiment 3 of the invention after the sensor frame has been subjected to machining.
FIG. 8B is a sectional view of the sensor frame at the longitudinally central portion after the sensor frame has been subjected to machining.
FIG. 8C is a sectional view of the sensor frame at the longitudinally central portion after respect parts are mounted on the sensor frame.

Embodiment 3 will be described below. FIG. 7A is a perspective view of a sensor frame according to Embodiment 3 before the sensor frame is subjected to machining. FIG. 7B is a sectional view of the sensor frame at the longitudinally central portion. In addition, FIG. 8A is a perspective view of the sensor frame which has been subjected to machining. FIG. 8B is a sectional view of the sensor frame at the longitudinally central portion. FIG. 8C is a sectional view of the sensor frame 70 on which a line light source 20, a rod lens array 30, and a sensor substrate 40 having sensor ICs 50 mounted thereon have been mounted. In the respective drawings, constituent parts the same as those in the sensor frame according to Embodiment 2 are referenced correspondingly.

As shown in FIGS. 7A and 7B, in Embodiment 3, the sensor frame 75 is extrusion-molded of aluminum so that a support portion 72 of the frame is located in the upper portion of the sensor frame 75 having a surface for reading the manuscript. Therefore, sensor substrate mount portions 77 are opened in configuration in advance. Then, as shown in FIG. 8A, the support portion 72 provided over the whole length of the sensor frame 75 is removed by machining while parts of the support portion 72 located at the longitudinally corresponding to the upper ends of the sensor frame 75 are left. By this step, a sensor frame 70 formed after the removal has a section shown in FIG. 8B.

Then, as shown in FIG. 8C, the sensor substrate 40 and the rod lens array 30 are mounted on the sensor frame 70 respectively, and then plates 100 (not shown) are mounted on the sensor frame 70 in a direction vertical to the plane of FIG. 8C. Thus, the space where the sensor ICs 50 are located is sealed off. Accordingly, there is no fear that foreign matter such as burrs and flash produced on the machined surfaces 74 enter the space where the sensor ICs 50 are located.

In addition, the machined surfaces are exposed at the upper portion of the sensor frame 70. Thus, the work of removing foreign matter from the machined surfaces after machining can be performed easily.

In addition, since the sensor substrate mount portions 77 are opened in configuration, it is not necessary to mount the sensor substrate 40 on the frame sensor 70 by insertion.

As described above, according to Embodiment 3, the sensor frame 75 is extrusion-molded so that the support portion 72 is located in the upper portion of the sensor frame 75. Then, the support portion 72 is removed by machining so that parts of the support portion 72 located at the longitudinally corresponding to the upper ends of the sensor frame 75 are left. Thus, the machined surfaces 74 are exposed at a position facing the manuscript reading surface. Accordingly, the work of removing foreign matter from the machined surfaces 74 can be performed easily. In addition, even if foreign matter is left on the machined surfaces 74, there is no fear that the foreign matter adheres to the sensor ICs 50 due to vibration or impact in transit after shipment.

In addition, since the sensor substrate mount portions 77 are formed to be opened in advance when the sensor frame 75 is extrusion-molded, the sensor substrate 40 can be mounted on the sensor substrate mount portions 77 without insertion. Accordingly, there is no production of foreign matter which might be produced by shaving the sensor frame 70 and the sensor substrate 40 if the sensor substrate 40 were to be inserted into the frame sensor 70.

Incidentally, in the reading mode described in Embodiment 3, the transparent plate 60 is made independent of the frame 70, so that the transparent plate 60 is fixed while the sensor frame 70 is moved for reading the manuscript 10. However, in an image sensor of a so-called sheet-feed type, the configuration may be made so that the transparent plate 60 is fixed to the sensor frame 70 and the image sensor is fixed to the image input portion while the manuscript 10 is moved to be read. Also by the latter image sensor, similar effects can be obtained.

Incidentally, an example in which aluminum was used as metal was shown in Embodiment 3. However, any kind of metal, any kind of alloy or any kind of resin may be used so long as such a material is suitable for extrusion-molding and can make the support portion 72 keep sufficient strength after machining.

As described above, according to the invention, there is provided a method for manufacturing a sensor frame for an image sensor, having the steps of: integrally forming the sensor frame by extrusion molding of metal or resin, the sensor frame including a sensor substrate mount portion, a light passageway, a lens array holding portion, and a frame support portion, the sensor substrate mount portion being opened for mounting a sensor substrate thereon, the light passageway being provided to communicate with the sensor substrate mount portion so that light reflected by a manuscript is transmitted to the light passageway through a rod lens array, the lens array holding portion being provided to communicate with the passageway for holding the rod lens array, the frame support portion being provided to support transversely the upper ends of the lens array holding portion; and removing the frame support portion by machining while leaving parts of the frame support portion located at longitudinally corresponding to the upper ends of the lens array holding portion. Accordingly, there is no fear that foreign matter enters the hollow space where the sensor ICs are located, so that the gray scale information of an image formed on the basis of the manuscript can be transmitted to the sensor ICs correctly.

In addition, there is provided another method for manufacturing a sensor frame for an image sensor, having the steps of: integrally forming the sensor frame by extrusion molding of metal or resin, the sensor frame including a sensor substrate mount portion, a frame support portion, a light passageway, and a lens array holding portion, the sensor substrate mount portion being provided for mounting a sensor substrate thereon, the frame support portion being provided under the sensor substrate mount portion so that a hollow portion is formed between the frame support portion and the sensor substrate mount portion, the light passageway being provided to communicate with the sensor substrate mount portion so that light reflected by a manuscript is transmitted to the sensor substrate through a rod lens array and the light passageway, the lens array holding portion being provided to communicate with the passageway for holding the rod lens array; and removing the frame support portion by machining while leaving parts of the frame support portion located at longitudinally corresponding to the lower ends of the lens array holding portion Accordingly, there is no fear that foreign matter enters the hollow space where the sensor ICs are located, so that the gray scale information of an image formed on the basis of the manuscript can be transmitted to the sensor ICs correctly.

In addition, there is provided a further method for manufacturing a sensor frame for an image sensor, having the steps of: integrally forming the sensor frame by extrusion molding of metal or resin, the sensor frame including a sensor substrate mount portion, a light passageway, a lens array holding portion, and a frame support portion, the sensor substrate mount portion being opened for mounting a sensor substrate thereon, the light passageway being provided to communicate with the sensor substrate mount portion so that light reflected by a manuscript is transmitted to the sensor substrate through a rod lens array and the light passageway, the lens array holding portion being provided to communicate with the passageway for holding the rod lens array, the frame support portion being provided in a position facing the manuscript; and removing the frame support portion by machining while leaving parts of the frame support portion located at longitudinally corresponding to the upper ends of the sensor frame. Accordingly, there is no fear that foreign matter enters the hollow space where the sensor ICs are located, so that the gray scale information of an image formed on the basis of the manuscript can be transmitted to the sensor ICs correctly.

What is claimed is:

1. A method for manufacturing a sensor frame for an image sensor, wherein said sensor frame includes;

a sensor substrate mount portion;

a light passageway;

a lens array holding portion; and a frame support portion, said sensor substrate mount portion being opened for mounting a sensor substrate thereon, said light passageway being provided to communicate with said sensor substrate mount portion so that light reflected by a manuscript is transmitted to said sensor substrate through a rod lens array, said lens array holding portion being provided to communicate with said passageway for holding said rod lens array, said frame support portion being provided to support transversely upper ends of said lens array holding portion;

said method comprising the steps of:

integrally forming said sensor frame by extrusion molding of either metal or resin, and removing said frame support portion by machining while leaving longitudinal parts of said frame support portion located at said upper ends of said lens array holding portion.

2. A method for manufacturing a sensor frame for an image sensor, wherein said sensor frame includes;

a sensor substrate mount portion;

a frame support portion;

a light passageway; and a lens array holding portion, said sensor substrate mount portion being provided for mounting a sensor substrate thereon, said frame support portion being provided under said sensor substrate mount portion so that a hollow portion is formed between said frame support portion and said sensor substrate mount portion, said light passageway being provided to communicate with said sensor substrate mount portion so that light reflected by a manuscript is transmitted to said sensor substrate through a rod lens array, said lens array holding portion being provided to communicate with said passageway for holding said rod lens array, said method comprising the steps of:

integrally forming said sensor frame by extrusion molding of either metal or resin, and removing said frame support portion by machining while leaving longitudinal parts of said frame support portion located at lower ends of said sensor substrate mount portion.

3. A method for manufacturing a sensor frame for an image sensor, wherein said sensor frame includes;

a sensor substrate mount portion;

a light passageway;

a lens array holding portion, and a frame support portion, said sensor substrate mount portion being opened for mounting a sensor substrate thereon, said light passageway being provided to communicate with said sensor substrate mount portion so that light reflected by a manuscript is transmitted to said sensor substrate through a rod lens array, said lens array holding portion being provided to communicate with said light passageway for holding said rod lens array, said frame support portion being provided in a position facing said manuscript, said method comprising the steps of:

integrally forming said sensor frame by extrusion molding of either metal or resin, and removing said frame support portion by machining while leaving longitudinal parts of said frame support portion located at upper ends of said sensor frame.

4. A sensor frame for an image sensor comprising:

a sensor substrate mount portion including an opening for mounting a sensor substrate thereon;

a light passageway configured to communicate with said sensor substrate mount portion so that light reflected by a manuscript is transmitted to said sensor substrate through a rod lens array, a first part of said sensor frame being on one side of said light passageway and a second portion of said sensor frame being on another side of said light passageway;

a lens array holding portion configured to communicate with said light passageway for holding said rod lens array, said lens array holding portion configured to contact opposite sides of said rod lens array; and a frame support portion connecting said first part of said sensor frame and said second part of said sensor frame, said frame support portion located outside of said light passageway, wherein the substrate mount portion, lens array holding portion, frame support portion, and first and second parts of said sensor frame are integrally molded together.

5. The sensor frame recited in claim 4 wherein said frame support portion is connected transversely to said first and second parts of said sensor frame at upper ends of said lens array holding portion.

6. The sensor frame recited in claim 4 wherein said frame support portion is located under said sensor substrate mount portion so that a hollow portion is formed between said frame support portion and said sensor substrate mount portion.

7. The sensor frame recited in claim 4 wherein said frame support portion is located in a position facing said manuscript at upper ends of said sensor frame.

* * * * *